Patented Mar. 17, 1953

2,631,964

UNITED STATES PATENT OFFICE 2,631,964

RECOVERY OF VITAMIN B₁₂

Karl J. Brunings, Jackson Heights, Robert J. Feeney, Brooklyn, and Isaiah A. Solomons III, Garden City, N. Y., assignors to Chas. Pfizer & Co., Inc., Brooklyn, N. Y., a corporation of Delaware No Drawing. Application December 9, 1950, Serial No. 200,091

5 Claims. (Cl. 167—81)

This invention relates to the isolation and purification of vitamin $B_{12}$, and particularly to the recovery of this vitamin from impure aqueous solutions containing other variants thereof, such as vitamin $B_{12b}$.

One of the principal sources of vitamin $B_{12}$ compounds is micro-organism fermentation broths. Various forms of the vitamin are elaborated by the growth of certain molds of the Actinomycetales order, especially *Streptomyces griseus*, *Streptomyces venezuelae* and similar antibiotic-producing organisms. The most usual forms of the vitamin recovered from such broths are $B_{12}$ itself and $B_{12b}$. Several vitamin recovery methods are in use, for instance adsorption from the broth followed by elution, precipitation by means of water-soluble salt, chromatography with alumina and extraction with an organic solvent, etc. It is the pure vitamin $B_{12}$ which is generally desired for commercial use in therapy and nutrition, but such methods produce mixed variants, especially materials having a high vitamin $B_{12b}$ content. Consequently it is important to separate vitamin $B_{12}$ itself from vitamin $B_{12b}$ and similar variants or derivatives which are less valuable. Further, some procedure is needed whereby these by-products can be converted to the pure vitamin $B_{12}$, to attain a single species and to decrease the high costs of manufacture.

It has now been found that vitamin $B_{12}$ may be readily recovered in large yield from aqueous solutions derived from microorganism fermentation broths by a process which simultaneously extracts the various usual variants of this vitamin, especially vitamin $B_{12b}$, and converts the same to the pure $B_{12}$ compound. This process broadly comprises treating the fermentation broth-derived solution with a hydroxylated organic solvent in the presence of a cyanide salt and of a neutral inorganic salt, the treatment being effected at a pH of at least 7. The reason for the efficiency of this treatment is not known. One theory is that the vitamin $B_{12}$ nucleus contains a cyano group, while the other $B_{12}$ forms, such as the $B_{12b}$, do not; apparently the cyanide reacts at a neutral to alkaline pH with the $B_{12b}$ and like nuclei to introduce the cyano group, so that the variant actually becomes pure vitamin $B_{12}$. Excess cyanide if present in the solution, markedly increases the extractability of the vitaminaceous components from the broth (or aqueous solution derived therefrom) into the organic extracting solvent, apparently by forming a cyanide complex of vitamin $B_{12}$ having a more favorable distribution than vitamin $B_{12}$ itself. This complex is extracted from the crude aqueous system and its various impurities. Excess cyanide may readily be removed from the extracted material to yield vitamin $B_{12}$.

According to more specific and preferred embodiments of this invention, we use an aqueous vitaminaceous solution which is obtained from a *Streptomyces* fermentation broth after recovery of antibiotic values and partial concentration or purification, or the clarified broth from a fermentation specifically for producing the vitamin. The vitamin $B_{12b}$ content of this solution is converted with excess cyanide to a vitamin $B_{12}$-cyanide complex and extracted from the aqueous system by treating with an alcohol-type organic solvent in the presence of a water-soluble, alkali metal cyanide and a substantially neutral inorganic salt like a sulfate. Such treatment is carried out at a neutral to alkaline pH, substantially between 7 and 10, whereby extraction is facilitated. The vitamin complexes are too unstable in more acid solutions, and there is usually no practical need for alkalizing above about 10.

As previously mentioned, these organic solvents which are useful as extracting agents, in conjunction with the two types of salts, are hydroxylated, that is, they contain free hydroxyl groups in their structure. Examples of valuable solvents are butanols, pentanols, phenols, cresols, benzyl alcohols, Cellosolves, mixtures of these and the like. Because of their attainability and relative cheapness, n-butanol and benzyl alcohol are most often used. If desired, various carrier solvents, such as benzene or toluene, may also be employed. It is obvious that the ratio of the extracting solvent to the aqueous system, which is required in a given operation, will depend upon the type of system under treatment, its content of $B_{12}$ variants, the apparatus used (whether separatory funnels, continuous centrifugal or countercurrent tower extractors or the like) and similar conditions which must be considered in a conventional extraction process.

The presence of certain inorganic salts is essential to proper extraction and the successful operation of the present invention, but the reason is not presently understood. It has been found that those inorganic salts which are generally termed "neutral" raise markedly the distribution coefficient of the $B_{12}$ complexes and the extraction of the vitaminaceous material from the crude aqueous phase into the organic solvent phase is thus facilitated. Particularly useful inorganic salts are sulfates, such as ammonium, sodium and magnesium sulfates and the like. The proportion of such salt used in a given treatment is not too critical; however, it is generally best to employ not quite enough to saturate the aqueous solution. With higher concentrations there may be a tendency to salt out part of the vitamin before extraction can be accomplished, although this may be avoided, of course, by diluting the solution. The peculiar effect of the neutral salt is usually not practically realized if a quantity is used which is less than about 5% by weight.

It has been discovered that the amount of cyanide salt necessary to implement conversion and extraction will vary depending upon the character of the vitamin $B_{12}$ variants to be treated, the cyanide salt chosen and the amount of vitaminaceous material in the particular microorganism broth system. Essentially any salt which possesses the cyanide anion can be utilized, but the most effective materials are generally the cyanides of alkali metals, such as sodium or potassium. Excess cyanide treating agent may readily be removed from the product in aqueous solution by precipitation as the silver salt or by similar well-known methods. If too little of the reagent is employed, the reaction will naturally be incomplete, and it has been found that most satisfactory results are obtained by using at least about one part by weight of the anion for each part of the vitamin present (calculated on the dry basis).

For commercial operations it is preferable to utilize as the raw material aqueous systems which contain vitamin $B_{12b}$ or mixtures of vitamin $B_{12}$ and vitamin $B_{12b}$ in potencies of about 0.01% or higher, calculated on the dry basis for the pure vitamin $B_{12}$. However, broth-derived materials of higher or lower potency may readily be treated, and dilute aqueous solutions having a vitamin concentration as low as 1 mcg./ml. have been satisfactorily used.

The vitamin $B_{12}$ product may be recovered after conversion and extraction as the cyanide complex by various methods. For instance, the solvent phase in which it is present may be separated from the waste aqueous phase and treated with acidified water, whereby the vitaminaceous material is reextracted into water. A pH of about 5 for this operation seems to be optimum. Excess cyanide anion may then be removed by aerating the aqueous extract, or by evaporating the same, or by precipitation as a water-insoluble salt. The aqueous vitamin phase may finally be dried by conventional means or further purified by a repetition of the method of this invention or by some known process, and highly purified or crystalline vitamin $B_{12}$ recovered.

Various other methods may be used for converting the cyano complex obtained in our recovery method for vitamin $B_{12}$. Merely diluting such solutions with water or with a solvent at any pH will serve to at least partially accomplish this, since an appreciable concentration of cyanide in excess must be present to maintain the complex. Various chemical agents which will combine with cyanide ion or convert it to another compound may be used. These include such compounds as formaldehyde and mercuric acetate.

The following examples are given simply to illustrate this invention and are not intended in any way to limit its scope.

*Example I*

A *Streptomyces griseus* fermentation broth was partially purified to obtain a concentrate assaying 55,000 mcg. of vitamin $B_{12}$ activity per gram and having a proportion of vitamin $B_{12b}$ to vitamin $B_{12}$ of about 9 to 1. One gram of this material was dissolved in 100 ml. of water, and 10 grams of sodium cyanide were added to the solution. The pH was adjusted to 9.6 and the solution was allowed to stand one-half hour and then saturated with sodium sulfate. The material was extracted three times with 100 ml. portions of n-butanol and the butanol extracts were combined.

The residual aqueous phase was extracted twice with 50 ml. of benzyl alcohol, to remove any remaining vitamin values, and these benzyl alcohol phases were then combined, mixed with an equal volume of benzene, and extracted with 50 ml. of water adjusted to pH 1 with sulfuric acid. All of the red color characteristic of vitamin $B_{12}$ passed to the aqueous phase. The hydrogen cyanide produced in the aqueous solution was removed by aeration and the solution was then neutralized. This product was assayed by determining the absorption of light at 548 millimicrons wave length, and was found to contain 3400 mcg. of vitamin $B_{12}$.

The combined butanol extracts were extracted successively with 100 ml., 50 ml. and 25 ml. portions of water adjusted to pH 1 with sulfuric acid. Excess hydrogen cyanide was removed from the combined aqueous solutions by aeration and the solution was adjusted to pH 7.5. This product displayed the characteristic maximum light absorption effect of vitamin $B_{12}$ at 548 millimicrons and contained 44,000 mcg. of the vitamin. This material, having a volume of 144 ml., was then treated with 40 grams of ammonium sulfate and extracted with 100 ml. of butanol to separate it from extraneous inactive materials. All of the characteristic vitamin color passed into the butonal phase. The butanol phase was extracted with several small portions of water and the extracts combined. This solution contained 41,000 mcg. of vitamin $B_{12}$ with a potency of 330 mcg./mg. of dry solids. The solution was evaporated to dryness, the residue was extracted with absolute ethanol and the extract was separated from insoluble material by centrifugation. This ethanol solution was then evaporated to dryness and the residue dissolved in a small volume of water. Treatment with acetone resulted in the formation of vitamin $B_{12}$ crystals weighing 35.8 mg. and having all of the characteristic properties of the pure vitamin. Thus, a crude mixture derived from a fermentation broth and containing a high proportion of vitamin $B_{12b}$ and only a minor proportion of vitamin $B_{12}$ was highly purified by alcohol-extractions in the presence of the cyanide ion and neutral sulfate salts, and at the same time had its vitamin content converted almost completely to pure vitamin $B_{12}$.

*Example II*

The vitaminaceous material to be treated here comprised an aqueous solution of 25 mg. of crystalline vitamin $B_{12b}$, devoid of vitamin $B_{12}$, in 13 ml. of water. This solution had an absorption spectrum showing maxima at 525, 351 and 274 millimicrons. Dry ammonium sulfate in the amount of 7.5 grams was added to the solution, and the material was placed in a separatory funnel. An equal volume of butanol, which had been equilibrated with a 50% aqueous ammonium sulfate solution, was introduced. One gram of sodium cyanide was added; the mixture was shaken until distribution was complete, and the separatory funnel was then allowed to stand for 30 minutes. The butanol phase which separated was purple in color, whereas the aqueous phase was practically colorless. The pH of the mixture was about 9 to 10. The aqueous layer was discarded and the butanol layer containing the vitamin $B_{12}$-cyanide complex was extracted four times with small volumes of water. The total volume of the aqueous extracts was 17 ml. and they contained practically all of the color. The exhausted butanol was discarded and the combined aqueous layers were adjusted to pH 1.0 with strong sulfuric acid. There was a marked color change upon addition of the acid, the purple shade changing to a distinct pink. This solution was allowed to stand 15 minutes and then a current of air was blown across its surface for 30 minutes. The aerated extract had no odor of hydrogen cyanide, but a slight precipitate of silver cyanide formed when a small volume of silver sulfate solution was added. The solution was centrifuged and the supernatant liquid was adjusted to pH 7 with sodium hydroxide. The volume of the solution at this point was 27 ml. Ammonium sulfate (13 grams) was added, and the aqueous solution was again extracted with an equal volume of butanol. Most of the vitamin present passed into the organic phase, which was separated and subjected to a conventional Craig countercurrent distribution between butanol and 50% ammonium sulfate solution using eight separatory funnels. A small amount of vitamin $B_{12b}$ (about 20% of the total amount of vitamin present) was found in funnels 6 and 7. In funnels 0 and 1 (butanol phase) about 80% of the total vitamin was present as vitamin $B_{12}$, as shown by determination of the ultraviolet absorption maxima. The latter two butanol phases were combined and extracted with water, the resulting aqueous solution was adjusted to 20% salt concentration with ammonium sulfate, and the vitamin was redistributed in a 12-tube Craig countercurrent system, using butanol. Most of the characteristic color indicating the presence of the vitamin here occurred in tubes 6, 7, 8 and 9. The contents of these tubes were combined, extracted into water, a neutral salt was added and the vitamin was reextracted into isopropanol. The latter solution was then concentrated to dryness and the dried solid extracted with anhydrous ethanol. This solution, after separation from residual inorganic salts, was evaporated to dryness and the product dissolved in a small volume of water. Crystalline vitamin $B_{12}$ itself was obtained by the cautious addition of acetone to this aqueous solution. The absorption spectrum of an aqueous solution of these crystals showed maxima at 548, 361 and 278 millimicrons, which conforms with the absorption spectrum of pure vitamin $B_{12}$ reported in the current scientific literature. In addition, the distribution coefficient of the new product between various concentrations of ammonium sulfate and butanol corresponds very closely to that of vitamin $B_{12}$ and differs markedly from that of the starting material vitamin $B_{12b}$. If vitamin $B_{12b}$ is allowed to stand for a short time in the presence of an aqueous solution of ascorbic acid, its activity is destroyed. However, the present crystalline product was not affected to any appreciable extent by the same exposure. The product was also found totally different from vitamin $B_{12b}$ in its behavior on a paper chromatogram. Its identity was further confirmed by microbiological assay with *L. leichmannii*, in which it is identical with vitamin $B_{12}$. Thus, the cyanide anion serves the dual purpose of greatly enhancing the extractability of vitamin $B_{12b}$ and of converting the same to vitamin $B_{12}$ through a cyanide complex, and is unique in this respect.

As many apparently widely different embodiments of this invention may be made without departing from the spirit and scope hereof, it is to be understood that the above invention is not limited except as defined in the appended claims.

What is claimed is:

1. A process which comprises extracting vitamin $B_{12}$-active materials from an aqueous solution having a pH of at least 7 and containing vitamin $B_{12}$-active materials derived from microorganism fermentation broths, a neutral inorganic salt and an excess of a cyanide salt beyond that required to convert said vitamin $B_{12}$-active materials to vitamin $B_{12}$ itself, whereby a vitamin $B_{12}$-cyanide complex is formed, into an organic phase comprising an hydroxylated organic extracting solvent of limited solubility in the aqueous solution, treating the vitaminaceous materials thus extracted to remove the excess cyanide associated therewith, and recovering the vitamin $B_{12}$ so produced.

2. The process of claim 1 wherein the cyanide salt is an alkali metal cyanide.

3. The process of claim 1 wherein the organic solvent is butanol.

4. The process of claim 1 wherein the organic solvent is benzyl alcohol.

5. A process which comprises extracting vitamin $B_{12}$-active materials from an aqueous solution having a pH of between about 7 and about 10 and containing vitamin $B_{12}$-active materials derived from microorganism fermentation broths, an inorganic sulfate and an excess of an alkali metal cyanide beyond that required to convert said vitamin $B_{12}$-active materials to vitamin $B_{12}$ itself, whereby a vitamin $B_{12}$-cyanide complex is formed, into an organic phase comprising an hydroxylated organic extracting solvent of limited solubility in the aqueous phase, treating the vitaminaceous materials thus extracted with acidified water to remove the excess cyanide, and recovering the vitamin $B_{12}$ so produced.

KARL J. BRUNINGS.
ROBERT J. FEENEY.
ISAIAH A. SOLOMONS III.

REFERENCES CITED

The following references are of record in the file of this patent:

UNITED STATES PATENTS

| Number | Name | Date |
|---|---|---|
| 2,530,416 | Wolf | Nov. 21, 1950 |

OTHER REFERENCES

Jackson—Journal of the American Chemical Society, volume 73, January 1951, pages 337 to 341.

Science, volume 112, September 29, 1950, pages 354, 355.